United States Patent [19]

Iwatani

[11] Patent Number: 4,900,436
[45] Date of Patent: Feb. 13, 1990

[54] APPARATUS FOR CAKE REMOVAL IN A FILTER PRESS

[75] Inventor: Akitoshi Iwatani, Marugame, Japan
[73] Assignee: Ishigaki Kiko Co., Ltd., Tokyo, Japan
[21] Appl. No.: 284,176
[22] Filed: Dec. 14, 1988
[30] Foreign Application Priority Data Dec. 26, 1987 [JP] Japan ............................ 62-330661

[51] Int. Cl.⁴ ............................................. B01D 25/32
[52] U.S. Cl. .................................. 210/225; 210/230; 100/198; 100/199
[58] Field of Search ............... 210/225, 227, 228, 229, 210/230, 224; 100/198, 199, 200, 202

[56] References Cited

U.S. PATENT DOCUMENTS

| | | | |
|---|---|---|---|
| 3,568,841 | 3/1971 | Kurita | 210/224 |
| 4,137,167 | 1/1979 | Kenyon et al. | 210/225 |
| 4,405,457 | 9/1983 | Busse et al. | 210/225 |
| 4,446,020 | 5/1984 | Kurita | 210/225 |
| 4,511,469 | 4/1985 | Iwatani | 210/225 |
| 4,773,996 | 9/1988 | Endo et al. | 210/225 |

Primary Examiner—W. Gary Jones
Assistant Examiner—Matthew O. Savage

[57] ABSTRACT

The invention relates to an apparatus for cake removal in a filter press, and comprises a filter-cloth jolting mechanism as the cake removing means, with individual filter plates interconnected by loose connecting means for separating the filter plates one from another in equally spaced-apart relation. A jolting device for swinging the filter plates as carried by guide rails is connected to the filter plates, so that if the filter plates are caused to swing when they are in spaced-apart condition, lower end portions of adjacent filter plates are caused to strike against each other, such that a jolting effect is thereby given to associated filter cloths so that cakes are removed therefrom.

5 Claims, 11 Drawing Sheets

APPARATUS FOR CAKE REMOVAL IN A FILTER PRESS

BACKGROUND OF THE INVENTION

1. Industrial Field of the Invention

The present invention relates to an apparatus for cake removal in a filter press of the type in which filter plates are adapted to be simultaneously separated from one another.

2. Prior Art

In the operation of a filter press, filtration is carried out when all filter plates are in a tightly assembled condition, and when cake has been accumulated in filter chambers after a predetermined period of filtration, it is necessary that supply of the liquid to be filtered be suspended for a while to enable the filter plates to be separated one from another for removal of the cake.

Therefore, according to the manner in which the filter plates are separated for the purpose of cake removal, filter presses may be broadly classified into two types, namely, the so-called simultaneous plate separation type in which individual filter plates entrained between a pair of clamping heads are simultaneously separated one from another for cake removal, and the so-called sequential plate separation type in which filter plates arranged between a pair of clamping heads are sequentially separated and assembled one by one, or by twos or more, so that each time adjacent filter plates are separated from each other, the cake accumulated between the filter plates are removed.

Conventional filter presses of the simultaneous plate separation type, in which the filter plates cannot be separated so wide apart from one another, are of such arrangement that when all the filter plates are simultaneously separated, filter cloths are caused to run simultaneously so that cakes depositing on individual filter cloths are conducted outward together with the filter cloths from spaces between individual pairs of adjacent filter plates for simultaneous removal of the cakes. In conventional filter presses of the sequential plate separation type, individual pairs of adjacent filter plates can be separated enough to give wide intervals therebetween and, accordingly, as they are sequentially separated, vibration is applied to each filter cloth between the adjacent filter plates separated, cake being thereby removed from the filter cloth.

3. Problems to be Solved

With conventional filter presses of the simultaneous plate separation type, therefore, it can be pointed out that since cake removal can be carried out on a simultaneous operation basis, they are advantageous in that a cake removal operation can be completed in a short time, on one hand, while on the other hand they have an inherent shortcoming that a cake removal apparatus employed therein involves a relatively high cost of manufacture. Conventional filter presses of the sequential plate separation type have an advantage that the provision of a cake removal apparatus for use therein involves less cost of manufacture, but on the other hand they are disadvantageous in that a longer period of operation is required for cake removal.

In the art of filter press, in order to enable accurate separation from filter cloth surfaces of cakes which are rather difficult to remove, if such cake is produced in the course of filtering operation, it has been customary to employ cake removal means of the filter cloth travelling type, as in simultaneous separation type filter presses in which, when the filter plates are separated, an interval provided between adjacent filter plates is rather small; and in the case of filter presses in which cake removal means of the filter cloth jolting type are used, it has been customary to employ a filter plate open/close arrangement of the sequential separation type in order to provide sufficient intervals between individual pairs of adjacent filter plates. However, the characteristics of the liquid to be filtered by any filter press may vary according to the site at which the filter press is employed; and not all liquids to be filtered are hard to filter, and not all cakes resulting from filtration are hard to be removed from filter cloth surfaces.

Therefore, where the liquid to be filtered is highly filterable, as in the case of ore-containing sludge, for example, and the resulting cake is so easily separable from filter cloth surfaces that when the filter plates are separated, a larger part of the cake produced is likely to drop by gravity, the filter cloth driving means in a conventional simultaneous plate separation type filter press in which a cake removing means of the filter cloth travelling type is employed is too costly for such means. It is also pointed out that a conventional sequential plate separation type filter press in which a cake removing means of the filter cloth jolting type is employed is very inefficient in that an excessively long period of time is required for removal of cakes that can be readily knocked out, as compared with the time required for filtering operation.

SUMMARY OF THE INVENTION

Object of the Invention

Accordingly, it is an object of the present invention to provide an apparatus for cake removal in a filter press which incorporates both the advantage of a simultaneous plate separation type filter press that simultaneous cake removal is possible and the advantage of a filter-cloth jolting type cake separating mechanism that the arrangement is very simple and permits efficient cake removal, and which, therefore, enables efficient separation from filter cloth surfaces of such readily removable cakes as may be produced when such readily filterable sludge as above mentioned, for example, an ore-containing sludge, is filtered.

Means for Solving the Problems

In order to accomplish the foregoing object, the present invention provides: for use in a filter press including a pair of parallel guide rails supported by machine frames at a predetermined level, a multiplicity of filter plates suspendedly supported on the rails for movement in the longitudinal directions of the rails, a pair of clamping heads disposed in such a way that the filter plates are entrained between the heads, the filter plates individually having their both surfaces covered with separate filter cloths, an apparatus for cake removal characterized in:

(i) that the filter plates, as well as each outermost one of the filter plates and one or the other of the clamping heads, are separably interconnected, at a level adjacent the upper surface of the guide rails, by loose connecting means which permit individual adjacent ones of the filter plates to be equally spaced from one another when the clamping heads are moved in opposite directions until they are apart a predetermined distance from each other, means for separating and assembling the filter plates together being connected to one or both of the two clamping heads;

(ii) that when the filter plates are separated from one another, they are individually swingable while being supported on the guide rails; and (iii) that the filter plates entrained between the clamping heads are equipped with jolting means such that if said means are operated when the filter plates are separated in equally spaced apart relation, any desired one of the filter plates can be caused to swing so that the lower end portion thereof is caused to strike against the lower end portion of a preceding or succeeding adjacent filter plate, whereby all the filter plates and associated filter cloths are jolted.

Function

The apparatus for cake removal in a filter press according to the invention as above arranged functions in the following manner.

The individual filter plates are suspendedly supported on the pair of parallel guide rails for movement in the longitudinal directions of the rails, and the filter plates, as well as each of opposite outermost filter plates and one or the other of the clamping heads, are interconnected at a level adjacent the upper surface of the guide rails by loose connecting means in such a way that when the clamping heads are moved in opposite directions until they are apart a predetermined distance from each other, the filter plates are separated one from another in equally spaced apart relation. Therefore, when the filter plates are separated in equally spaced apart relation, the filter plates, as suspendedly supported on the guide rails, can be caused to swing about their respective portions at which they are interconnected by the connecting means and/or about their respective portions at which they are suspended on the guide rails.

The filter plates entrained between the pair of clamping heads are equipped with jolting means. When the filter plates are separated in equally spaced apart relation, if the jolting means are acted upon any or all of the filter plates, those filter plates which are subjected to the action of the jolting means are caused to swing so that each of them is caused to strike at its lower end portion against the lower end portion of a preceding and/or succeeding adjacent filter plate, whereby all the filter plates and associated filter cloths can be jolted.

In a filter press equipped with such apparatus for cake removal, therefore, when, upon completion of a filtering operation, the clamping heads are moved away from each other with the predetermined distance therebetween and accordingly filter plates are separated from one another in equally spaced apart relation as above mentioned, the jolting means being then acted upon the filter plates, cakes depositing on the filter cloths can be completely removed in the following sequence, if the cases are readily separable ones.

Where cakes present on individual filter cloths are reasonably separable, a larger part of the cake formed in each filter chamber is allowed to drop under its own weight from the space between the adjacent filter plates as individual filter chambers are opened one after another by the clamping heads moving on the guide rails and instantly when the filter plates are separated apart. If any part of the cakes remains unremoved by gravity, all such cake can be separated from the filter cloth surfaces through the jolting action of the jolting means as driven when all the filter plates are separated in equally spaced apart relation, whereupon the filter plates and associated filter cloths are simultaneously jolted.

DESCRIPTION OF THE PREFERD EMBODIMENTS

Referring to FIGS. 1 through 14, inclusive, in which one embodiment of the invention is illustrated, a pair of parallel guide rails 3 are horizontally supported by a pair of machine frames 1, 2, and on the pair of guide rails 3 there are arranged a pair of clamping heads 4, 5 and a multiplicity of filter plates 6 entrained between the clamping heads 4, 5. The clamping heads 4, 5 are each supported on the guide rails 3 through a plurality of wheels (not shown) and movable in the longitudinal directions of the guide rails 3. The filter plates 6 are suspendedly supported on the guide rails 3 through arms 7 projecting laterally from the individual filter plates 6 so that they are movable in the longitudinal directions of the guide rails 3. Reference numeral 8 designates liners mounted to each pair of arms 7 at portions at which the arms 7 are in contact with the guide rails 3.

The individual filter plates 6 and the clamping heads 1, 2 are separably interconnected at a level adjacent the upper surface 3a of the guide rails 3 by chains 9, each consisting of a multiplicity of oblong annular links 9a connected to one another, and the filter plates 6 are individually swingable when they are in their separated apart condition.

To explain more concretely, the clamping heads 4, 5 and the filter plates 6 are individually provided with brackets 11 secured to their arms 7 at locations right above the level at which they are supported on the guide rails 3, each bracket 11 having a chain engagement groove 10 for engagement with one of the annular links 9a constituting one of the chains 9, so that the chain engagement grooves 10 of the brackets 11 are engaged by alternate annular links 9a of each chain 9 (see FIGS. 3, 4, and 8), whereby the filter plates 6 and the clamping heads 4, 5 are loosely interconnected by chains 9 so that they can be separated to provide a specified interval $\alpha$ between each two adjacent filter plates 6 and between each outermost filter plate 6 and one or the other of the clamping heads 4, 5 and can be assembled together to close such interval.

Figure 1:
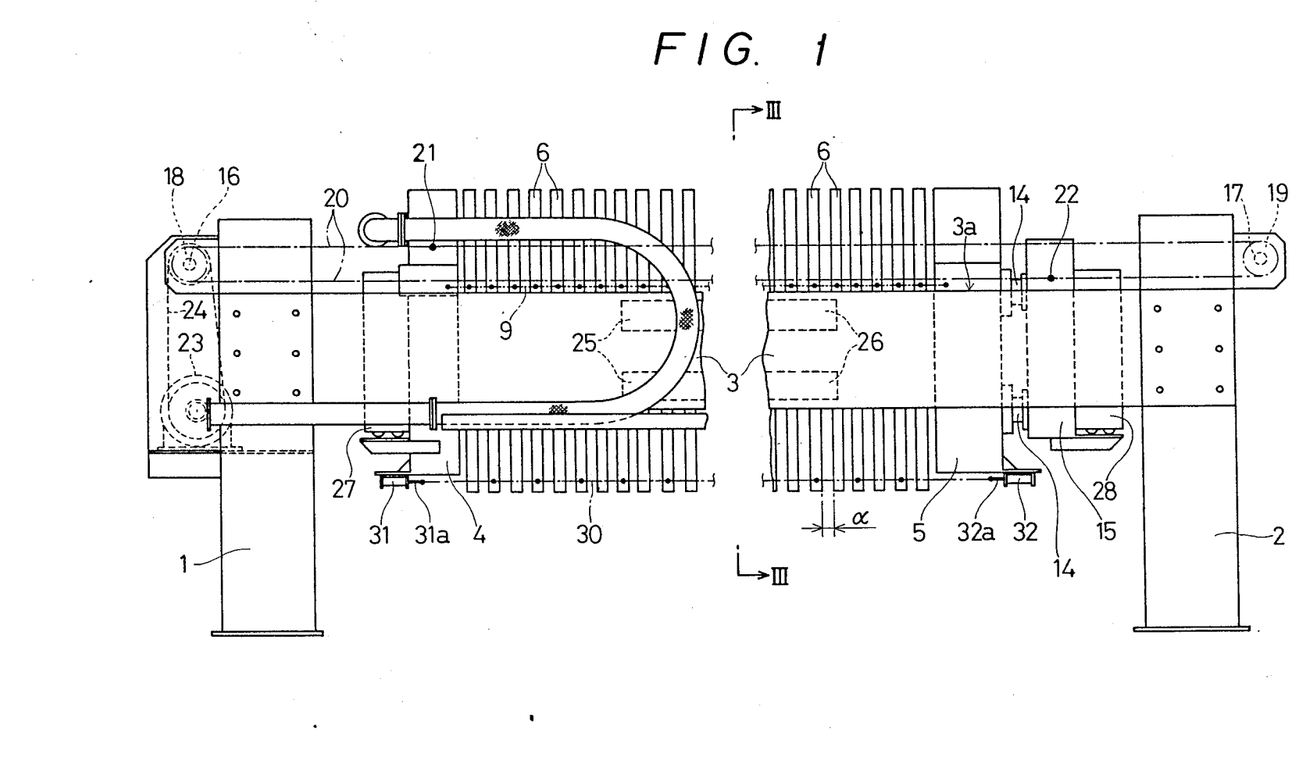
FIG. 1 is a partially cutaway side view showing a filter press incorporating one embodiment of the invention as it appears when individual filter plates are in their separated apart condition.
Figure 2:
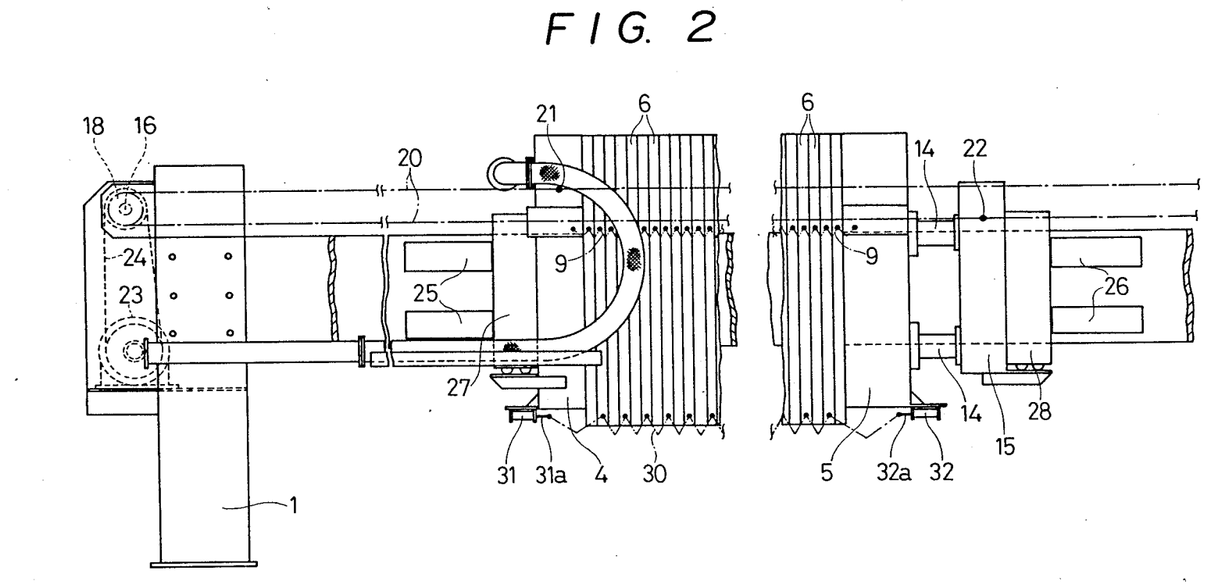
FIG. 2 is a partially cutaway side view showing the filter press as it appears when individual filter plates are in their assembled condition.
Figure 3:
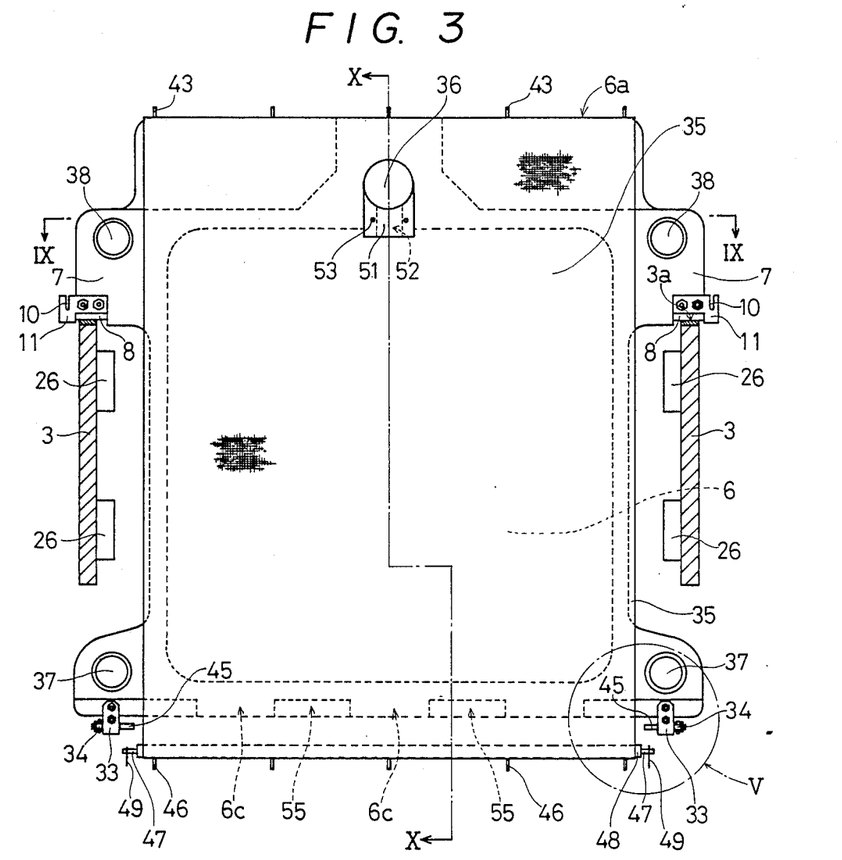
FIG. 3 is an enlarged front view showing a filter plate with a filter cloth mounted in position.
Figure 4:
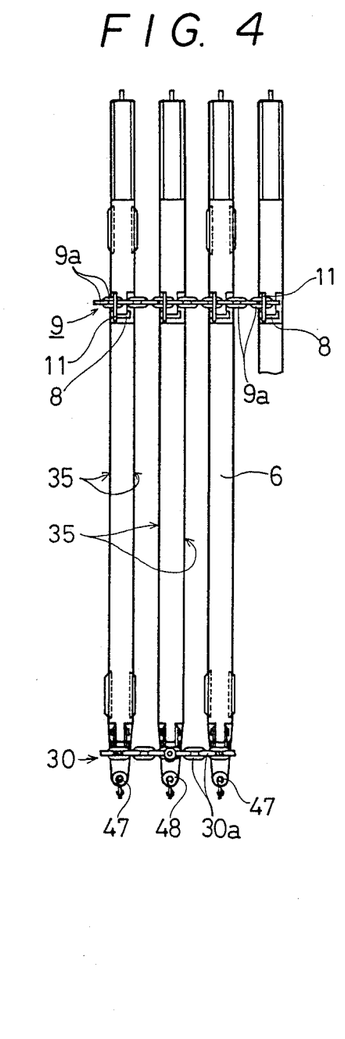
FIG. 4 is a side view showing a plurality of adjacent filter cloths.
Figure 5:
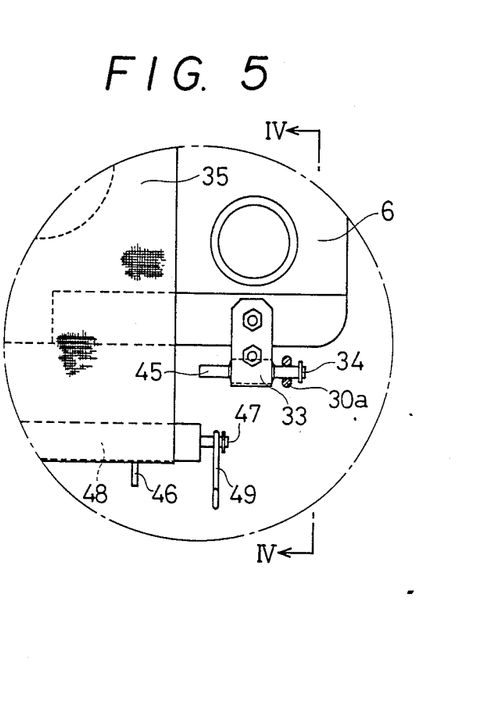
FIG. 5 is an enlarged view showing a lower portion of (portion V in FIG. 3) of a filter plate.
Figure 6:
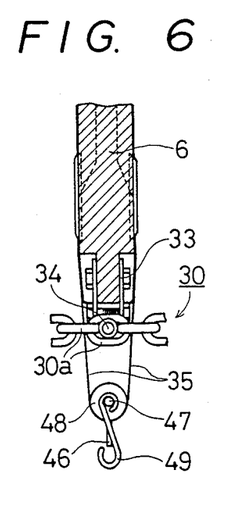
FIG. 6 is a side view thereof (with a section taken along line VI—VI in FIG. 5)

In this filter press, therefore, when the filter plates 6 are in their separated apart condition as in FIG. 1, in which they are separated one from another to give predetermined intervals $\alpha$ therebetween, if the clamping heads 4, 5 positioned at opposite ends are simultaneously advanced toward each other, the intervals $\alpha$ between individual pairs of adjacent filter plates 6, as well as those between outermost filter plates 6 and the clamping heads 4, 5, are sequentially inwardly closed until the clamping heads 4, 5 and filter plates 6 are assembled together as in FIG. 2. Conversely, when the filter plates 6 are in their assembled condition, if the clamping heads 4, 5 are moved away from each other, the filter plates 6 and clamping heads 4, 5 are separated to the FIG. 1 condition.

In the filter press, individual filter plates 6, as well as the clamping heads 4, 5 and filter plates 6 nearest thereto, are separably interconnected by aforesaid chains 9 at a level adjacent the upper surface of the guide rails 3; therefore, when the filter plates 6 are in their separated apart condition (FIG. 1) in which they, as well as outermost ones of them and the clamping heads 4, 5, are separated from one another in equally spaced relation, the filter plates 6 can be individually caused to swing about their respective portions at which they are connected to the chains 9 or their respective portions at which they are in contact with the guide rails 3 by applying an external force to their respective lower end portions in the direction of movement of the plates 6.

In order to enable filtering operation to be carried out when the filter plates 6 and clamping heads 4, 5, as a whole, are in their assembled condition as in FIG. 2, and also enable cake removing operation to be carried out when the filter plates 6 and clamping heads 4, 5 are in their separated apart condition as in FIG. 1, according to the invention, the filter press is equipped with such forward/reverse drive means for the clamping heads 4, 5 and such filter plate tightening means as will be hereinafter described, and also with jolting means for jolting the filter plates 6 which will be described hereinafter.

First, the forward/reverse drive means for clamping heads and the filter plate tightening means will be described. Behind the one clamping head 5 there is disposed a movable beam 15 which is supported on the guide rails 3 through wheels (not shown) in same manner as the clamping head 5. The movable beam 15 and the clamping head 5 are interval-changeably interconnected by four double-acting hydraulic cylinders 14 so that if the movable beam 15 is driven for forward or reverse movement on the guide rails 3, the clamping head 5 is caused to move forward or backward following the movable beam 15. Drive means for moving the clamping heads 4, 5 between their positions for aforesaid separated condition and assembled condition comprise a pair of sprocket wheels 18, 19 disposed at opposite ends of the filter press and rotatably supported at 16, 17 on the machine frames 1, 2 (or on the guide rails 3), substantially endless cord-like drive elements 20 trained around the sprocket wheels 18, 19 and running along the entrained assembly of the clamping heads 4, 5, filter plates 6, and movable head 15 at both sides of the assembly, connecting means 21, 22 for connecting the cord-like drive elements 20, at suitable points of their portions running in the longitudinal directions of the guide rails 3, to the clamping head 4 and the movable beams 15 respectively, a reversible motor 23 for forward and reverse driving the cord-like drive elements 20, and an interlocking mechanism 24 between the motor 23 and the sprocket wheel 18. When the endless cord-like drive elements 20 are driven forward or reverse, the clamping heads 4, 5 are simultaneously moved forward or backward so that the clamping heads 4, 5 and the filter plates 6 are separated apart or assembled together in manner as above described.

In conjunction with such forward/reverse drive means, in the present embodiment, there are releasably provided locking means for locking the clamping head 4 and the beam 15 respectively against backward movement when they are brought to their forward position, that is, when the filter plates 6 are in their assembled condition (FIG. 2). More specifically, at suitable locations on the guide rails 3 there are provided locking projections 25, 26 for unretreatably locking the clamping head 4 and the movable beam 15 respectively when they are at their respective advanced positions; and behind the clamping head 4 there is mounted in position a pair of movable stoppers 27 and behind the movable beam 15 there is mounted in position a pair of movable stoppers 28, said stoppers 27, 28 being engageable with and disengageable from the locking projections 25, 26 respectively as desired. In the filter press of the present embodiment, therefore, when the clamping heads 4, 5 and the filter plates 6 are in their assembled condition, the train of filter plates 6 between the clamping heads 4 and 5 can be tightened to a closed condition suitable for filtering operation by unretreatably locking both the clamping head 4 and the movable beam 15, then stretching the hydraulic cylinder 14 to further advance the clamping head 5. Such simultaneous forward/reverse drive mechanism and tightening mechanism as above said are described in Japanese Published Unexamined Patent application No. 59-32911 (U.S. Pat. No. 4,511,469), and therefore any further description thereof is omitted.

Nextly, the filter plate jolting means will be explained which are provided in the filter press of the present embodiment for jolting the filter plates 6 in their separated apart condition. In the present embodiment, the jolting means are in the form of chains 30, which extend along the train of filter plates 6 at both sides thereof and which are taut when the filter plates 6 are separated from one another to give equal intervals $\alpha$ between each two adjacent ones of them. More specifically, the jolting means comprise chain 30 connected to alternate ones of the filter plates 6 at their lower sides, and drive means for driving the chains 30 forward and backward in the longitudinal directions thereof. If the chains 30 are driven forward and backward in their longidudinal directions when the filter plates 6 entrained between the clamping heads 4 and 5 are in their separated apart condition with interplate intervals a, those filter plates 6 which are connected at their lower end portions to the chains 30 in taut condition are caused to swing so that their lower end portions are caused to strike against comparable portions of those filter plates 6 which are not connected to the chains 30, whereby all the filter plates 6 are jolted.

In the jolting means of the present embodiment, means for driving the chains 30 in manner as above mentioned comprise a pair each of double acting air cylinders 31, 32 mounted to the clamping heads 4, 5 at suitable locations, ends of the chains 30 being connected to respective piston rods 31a, 32a of the double-acting air cylinders 31, 32. As may be seen from FIGS. 4 to 6, each of the chains 30 is connected at suitable portions thereof to lower end portions of alternate filter plates 6 by its constituent oblong annular links 30a being individually fitted on corresponding pins 34 projecting laterally from the lower end portions of the alternate filter plates 6 through brackets 33, so that when the piston rods 31a, 32a of the air cylinders 31, 32 are driven to reciprocate in same directions, the chain 30 is caused to reciprocate in the longitudinal directions thereof, whereby the alternate filter plates 6 connected to the chain are caused to swing.

Figure 7:
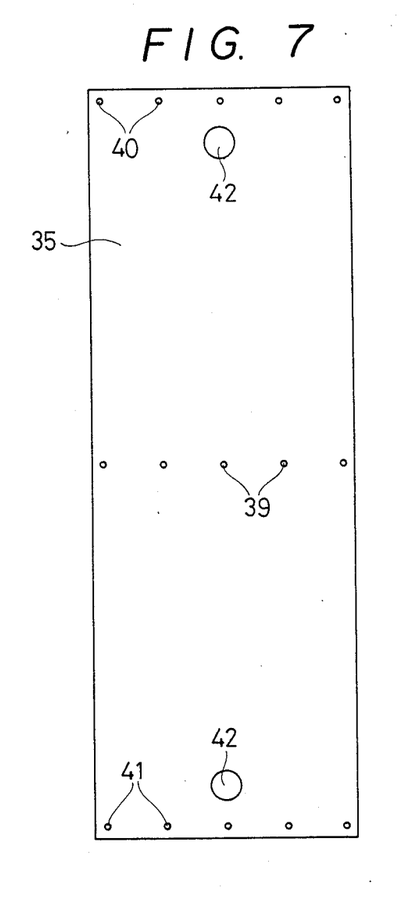
FIG. 7 is a plan view showing one filter cloth prior to being mounted to a filter plate.
Figure 8:
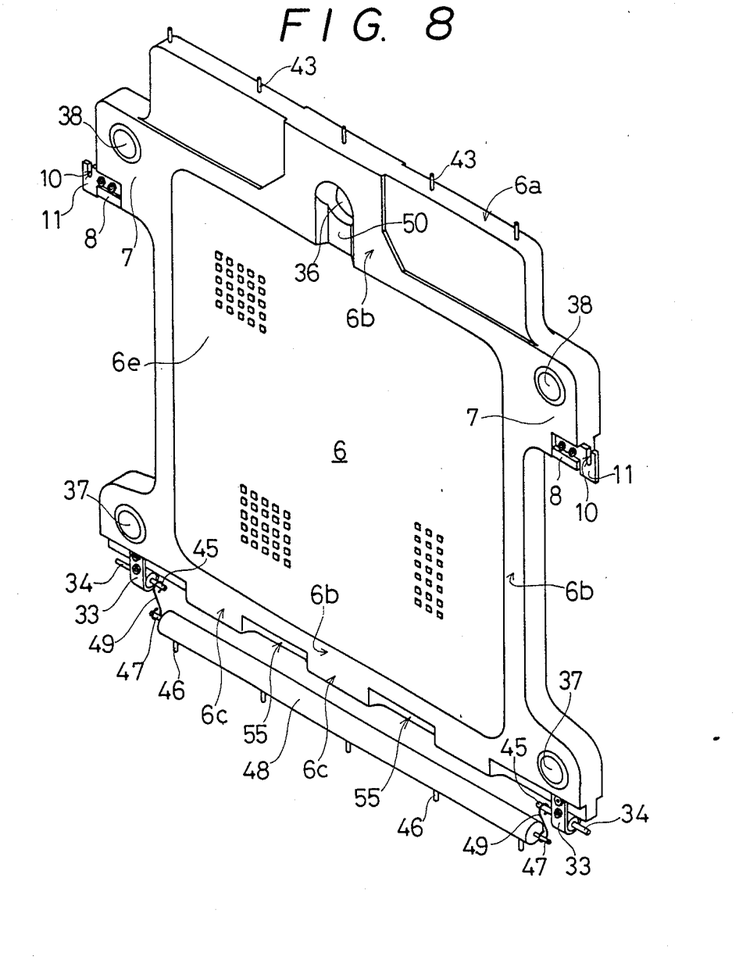
FIG. 8 is a perspective view showing a filter plate from which the filter cloth is removed.
Figure 9:
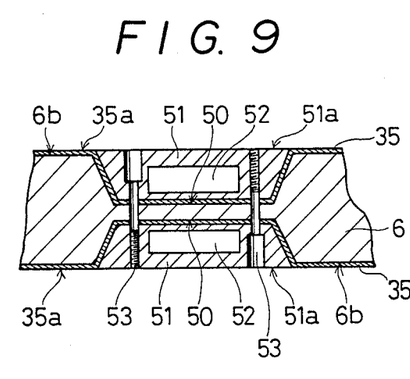
FIG. 9 is a cross sectional plan view (with a section taken along line IX—IX in FIG. 3) showing a portion of a filter plate that is fitted with slurry feed blocks.
Figure 10:
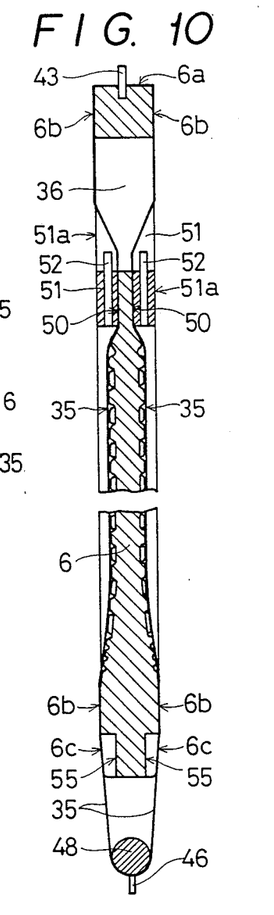
FIG. 10 is a partially cutaway longitudinal sectional view of the filter plate in side elevation taken along line X—X in FIG. 3.
Figure 11:
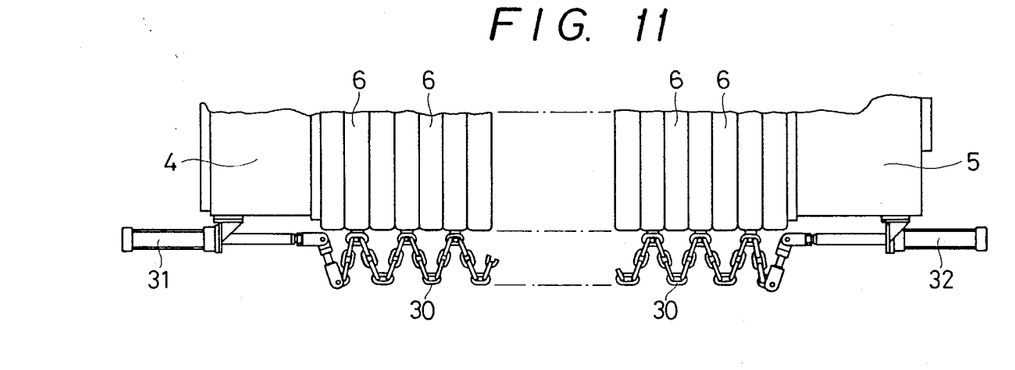
FIGS. 11 to 14, inclusive, are partially cutaway side view showing details of jolting means for filter plates, FIG. 11 being a side view as seen when filter plates are in their assembled condition, FIG. 12 being a side view as seen when the filter plates are in their separated apart condition, FIGS. 13 and 14 being side views as seen when the filter plates are caused to swing and jolted.

Nextly, filter cloths 35 placed on the individual filter plates 6 and means for mounting them to the filter plates 6 will be described with reference to FIGS. 3 to 10, inclusive. Each filter plate 6 is formed with a slurry feed hole 36, filtrate discharge and air blow holes 37, 38, etc., which holes are all similar to those in any known single-type filter press, opposite surfaces of the filter plate 6 being covered with such a filter cloth of rectangular shape which is further described hereinbelow. As FIG. 7 shows, the filter cloth 35 has suitable numbers of pin holes 39, 40, 41 formed individually at locations between median points of longer sides of the cloth and at locations adjacent two shorter sides thereof, and a pair of slurry holes 42 formed at suitable locations. Each filter plate 6 has, at suitable locations on its top end 6a, upwardly projecting pins 43 in same number as said pin holes 40, and at its lower end portion, a pair of inwardly projecting pins 45 supported by said pair of brackets 33; and below the filter plate 6 there is provided a weight bar 48 having on its periphery pins 46 in same number as said pin holes 39, and at its both ends, a pair of outwardly projecting pins 47, said weight bar 48 being disengageably suspendedly supported by said pins 45 through a pair of hanging elements 49 connected (or engaged) at one end to (by) said pins 47. When the weight bar 48 is suspended from the filter plate 6 through the hanging elements 49, the pins 46 are fitted through the pin holes 39 of the filter cloth 35, and the filter cloth 35 is folded in U shape to cover opposite surfaces of the filter plate 6, the both ends of the cloth 35 being then wrapped over the top end 6a of the filter plate 6 so that said pin holes 40, 41 are brought into engagement with said pins 43. Subsequently, the hanging elements 49 are disengaged from the pins 45, whereupon the load of the weight bar 48 which has been suspendedly supported by the hanging elements 49 acts on the filter cloth 35 and thus those portions of the filter cloth 35 which cover both surfaces of the filter plate 6 are brought in abutment against the surfaces of the filter plate 6 in taut condition.

Each filter plate 6, whose both surfaces are covered with such filter cloth 35, has on both sides thereof frame-shaped filter cloth sealing faces 6b which are each formed, at a level below said slurry feed hole 36, with a pair of grooves 50 leading from said feed slurry hole 36 to a filter bed 6e, and each filter cloth 35, mounted to the filter plate 6 in manner as above described, has its slurry holes 42 positioned in register with said slurry feed hole 36 in the filter plate 6 and is, at its portions covering the grooves 50, kept in intimate contact with the surface of the grroves 50 through slurry feed blocks 51 that fit in the grooves 50 across from the filter cloth 35, which blocks 51 will be further described hereinbelow. The slurry feed blocks 51, provided in a pair, each have a vertical slurry passage 52 and are fitted in the grooves 50 in such a way that when they are so fitted across from the filter cloth 35, their surfaces 51a are flush with the surface portions 35a of the filter cloth 35 which cover said filter-cloth sealing faces 6b of the filter plate 6. This pair of slurry feed blocks 51 are fixed to the filter plate 6 by bolts 53 coupling the blocks 51 together. The slurry feed blocks, each having said vertical slurry passage 52 formed therein, are such that when adjacent filter plates 6 are tightly assembled together, slurry is supplied into a filter chamber defined between the surfaces of the opposed filter cloths 35 through the slurry passages 52 of said slurry feed blocks 51.

In lower end portions on both sides of each filter plate 6 having its opposite surfaces covered with such a filter cloth 35 as above described, there are provided, at a plurality of transversely spaced locations, recesses 55 formed by partially cutting out a lower part of said frame-shaped filter-cloth sealing face 6b at transversely suitable intervals. In the filter press of the present embodiment, therefore, when individual filter plates 6 are caused to swing to produce jolting effect such that lower end portions of adjacent filter plates 6 are caused to strike against each other. In this case, lower end portions of the filter plates 6 which are caused to strike against each other will collide with each other across from filter cloth 35 at their portions 6c which have no recess formed therein.

Figure 12:
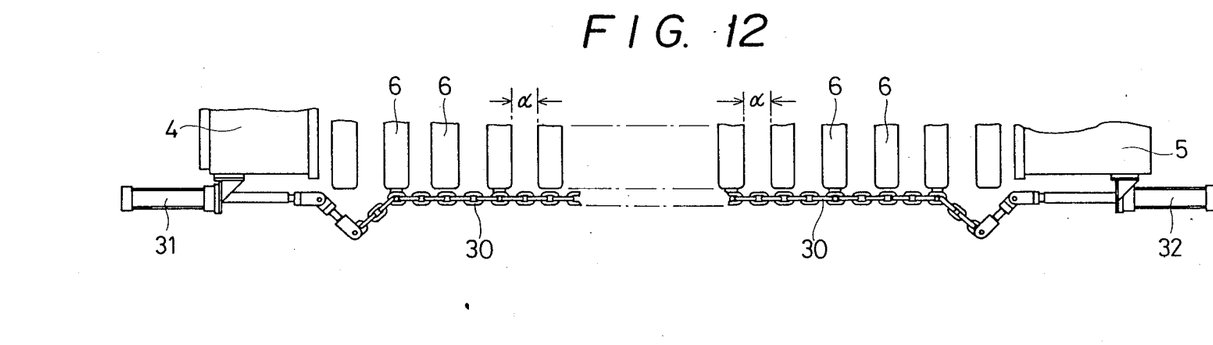
Figure 13:
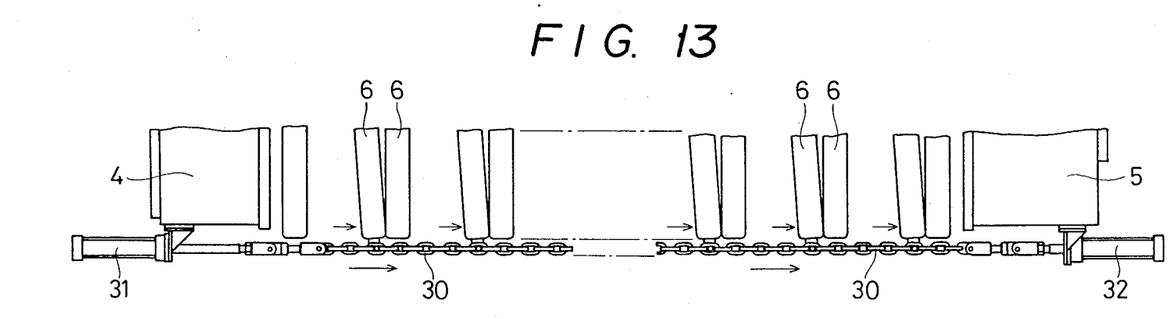
Figure 14:
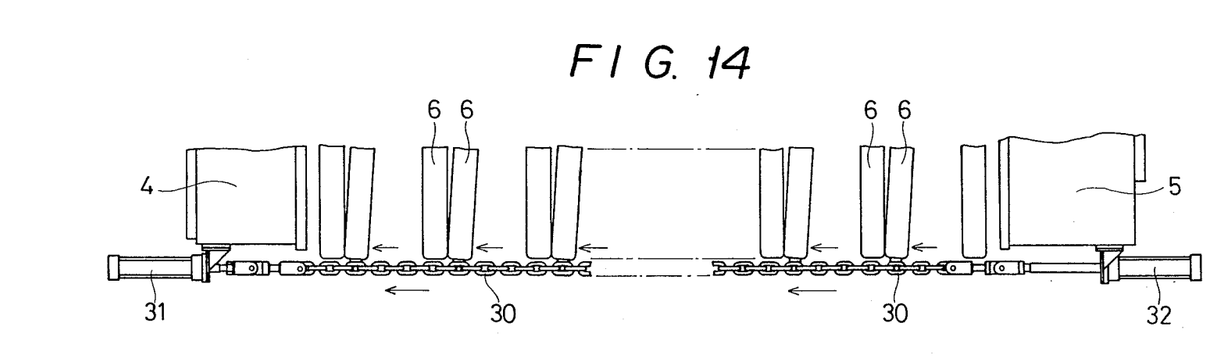

The manner of operation of the above described embodiment will now be explained. When the filter plates 6 are in their assembled state (see FIGS. 2 and 11), slurry is fed into individual filter chambers through the slurry feed holes 36 in order to carry out a filtering operation. To remove cakes accumulated in individual filter chambers after the filtering operation, supply of slurry is suspended and all the filter plates 6 are simultaneously separated apart (FIG. 1 and 12). Cakes accumulated in the filter chambers are allowed to drop by gravity instantly when the chambers are opened, if they are characteristically highly separable ones. If some cake is still present on the surfaces of filter cloths 35 when the filter plates 6 are in the FIG. 12 condition in which they are separated apart with equal intervals α between them, then said pair of double acting air cylinders 31, 32 are driven to reciprocate in same directions so that the chains 30 connected to lower end portions of alternate filter plates 6 are caused to reciprocate in the longitudinal directions thereof. Then, as FIGS. 13 and 14 show, the lower end portion of each of the alternate filter plates 6 is caused to alternately strike against lower end portions of adjacent filter plates 6, preceding and succeeding, and the resulting impact gives jolting effect to both the filter plates 6 and the associated filter cloths 35, so that cakes which are still present on the filter cloths 35 can be separated from the filter cloths 35 through such jolting effect.

In the present embodiment, as above stated, filter cloth 35 is wrapped around the lower end portion of each filter plate 6, and said lower end portion around which the filter cloth 35 is wrapped is formed at transversely spaced locations with such recesses 55 as above described (see FIGS. 8 and 10); and lower end portions of adjacent filter plates 6 are caused to strike against each other across from filter cloth 35 at portions 6c having no such recess 55 formed therein, while at portions in which such recesses 55 are formed, the lower end portions of the filter plates 6 are not allowed to strike against each other across from filter cloth 35. Therefore, the filter cloth 35 wrapped around the lower end portion of each filter plate 6 is not liable to break at portions covering the recesses 55 as a consequence of said lower end portion striking against the corresponding portion of an adjacent filter plate 6, though at its portions covering the portions 6c formed with no such recess 55, the filter cloth 35 may be subject to breakage as a consequence of such collision. Therefore, the filter cloth 35 is not liable to break, over its entire width, due to collision of the lower end portion of the filter plate 6 with the comparable portion of an adjacent filter plate 6, and thus it can be permanently kept as wrapped on the lower end portion of the filter plate 6.

Figure 15:
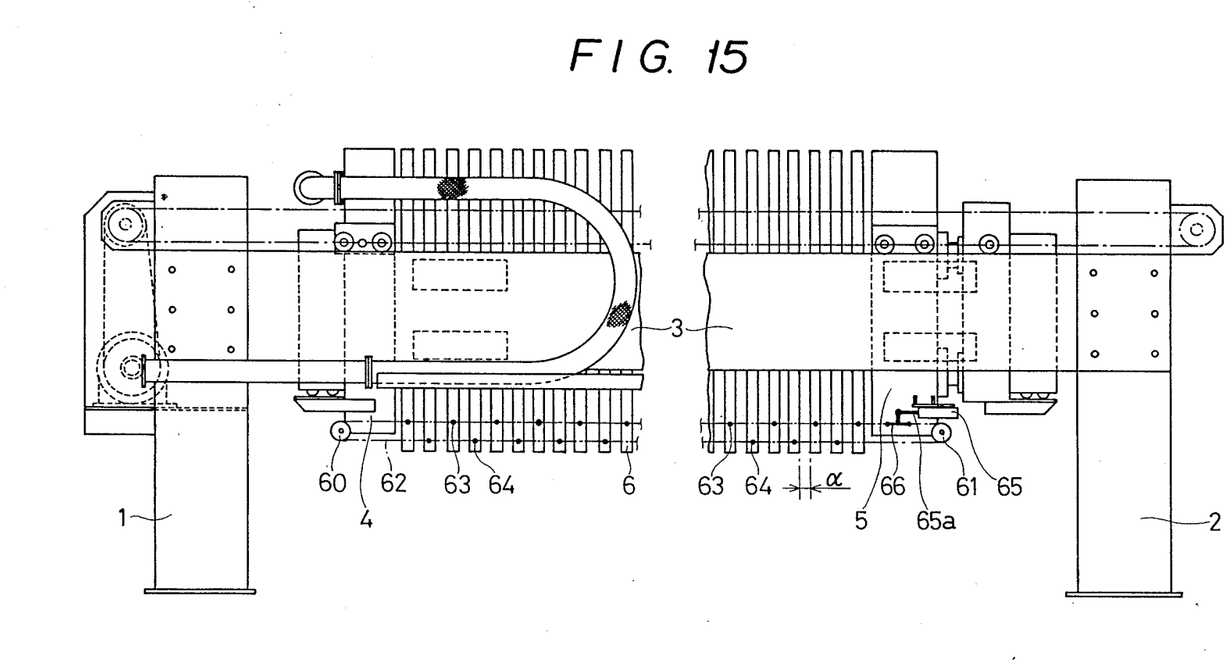
FIG. 15 is a partially cutaway side view showing a filter press representing another embodiment.

In the above described embodiment, the jolting means provided in the train of filter plates 6 comprises one chain 30 connected to lower end portions of alternate filter plates 6 at each side thereof. In another embodiment, as FIG. 15 shows, the jolting means for the filter plates may comprise one pair each of sprocket wheels 60, 61 rotatably supported at suitable locations on both sides of the clamping heads 4, 5, two endless chains 62, each trained around one or the other pair of sprocket wheels 60, 61 and extending alongside the train of filter plates 6, and forward/reverse drive means for the chains 62. Each of the endless chains 62 is set to a length such that when the clamping heads 4, 5 are separated the predetermined distance apart and the filter plates 6 are separated apart to give equal intervals $\alpha$ between individual pairs of adjacent plates 6, the endless chain 62 is kept in taut condition; and one portion of each endless chain 62 which is adapted to run along the train of filter plates 6 in one direction (i.e., upper portion) may be connected at 63 to odd-numbered filter plates 6 counting from the first one next to the one clamping head 4 and the other portion of the endless chain 62 which is adapted to run in the opposite direction (i.e., lower portion) may be connected at 64 to even-numbered filter plates 6 counting from said first one next to the one clamping head 4.

In the FIG. 15 embodiment, the forward/reverse drive means for the chain 62 comprises an air cylinder 65 having its piston rod 65a connected at 66 to the chain 62, whereby in the apparatus for cake removal in the present embodiment, if the piston rod 65a of the air cylinder 65 is driven to reciprocate when the filter plates 6 are in their separated apart condition, the endless chain 62 is caused to alternately run forward and reverse so that lower end portions of the filter plates 6 which are connected at 63 and 64 to the endless chain 62 are caused to swing, whereby lower end portions of the odd-numbered filter plates 6 are individually caused to strike against corresponding portions of the even-numbered filter plates 6.

In this way, upon collision of the lower end portions of adjacent filter plates 6, jolting effect is given to both the filter plates 6 and the filter cloths 35 as is the case with the earlier described embodiment, and cakes depositing on the filter cloths 35 are thus removed.

Figure 16:
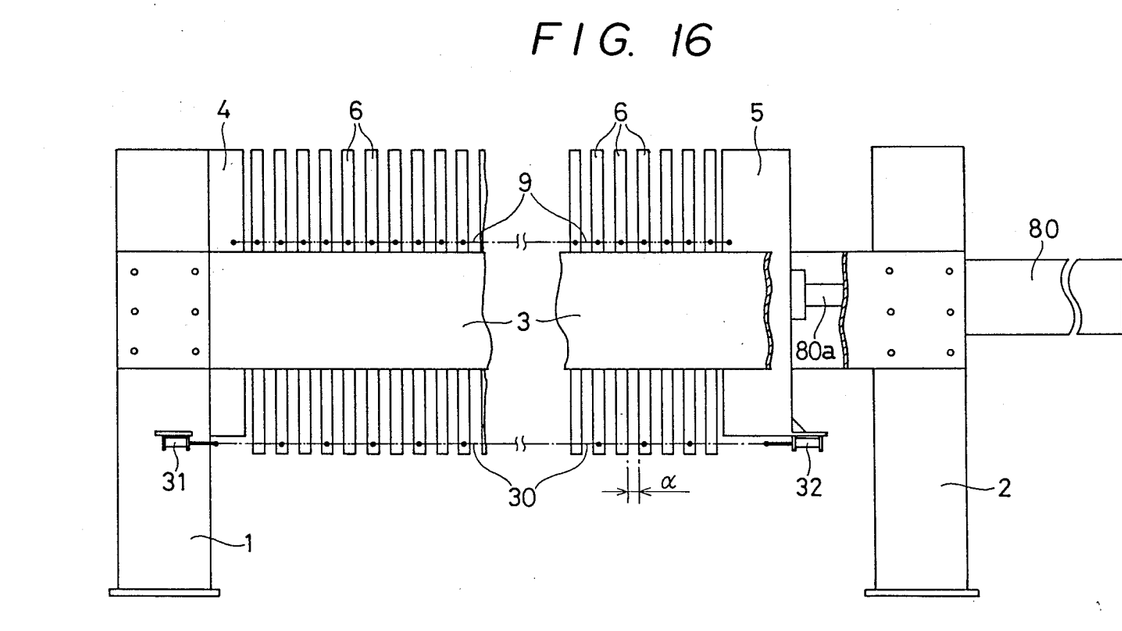
FIG. 16 is a side view showing a still further embodiment as seen when filter plates in the filter press are in their separated apart condition.

The foregoing embodiments relate to the case in which the apparatus for cake removal in accordance with the invention is applied to a filter press of the type in which a pair of clamping heads 4, 5, disposed at positions between which the filter plates 6 are entrained, is carried on a pair of parallel guide rails 3 supported by a pair of machine frames 1, 2 so that the clamping heads 4, 5 are both movable on the guide rails 3 in the longitudinal directions thereof. Alternatively, the cake removal apparatus of the invention may be applied to filter presses of such type as shown in FIG. 16, wherein of the clamping heads 4, 5 disposed at positions between which the filter plates 6 are entrained, the one clamping head 4 is fixed to one machine frame 1 and the other clamping head 5 only is movable on guide rails 3 supported by machine frames 1, 2 and in the longitudinal directions thereof. In the filter press of the embodiment shown in FIG. 16, when said other clamping head 5 is driven to move forward and backward by means of piston rod 80a of a hydraulic cylinder 80 connected to the head 5, the filter plates 6 are assembled together and separated in equally spaced apart relation; the embodiment differs from the preceding embodiments only in that a pair of hydraulic cylinders 31 is mounted to the machine frame 1 to which the clamping head 4 is fixed, and not to the clamping head 4. In the filter press of this embodiment, as well as in the earlier described embodiments, when the individual filter plates are separated one from another in equally spaced apart relation, hydraulic cylinders 31, 32 are driven to reciprocate so that chains 30 connected to lower end portions of alternate filter plates 6 are caused to run forward and backward, lower end portions of the filter plates being thereby caused to strike against corresponding portions of adjacent filter plates 6, whereby cakes depositing on the filter cloths can be removed.

ADVANTAGES OF THE INVENTION

The apparatus for cake removal in accordance with the invention, as already described with respect to their function, is such that when all the filter plates are in their separated apart condition, lower end portions of individual adjacent plates are caused to strike against one another, whereby all the filter plates and associated filter cloths are subjected to impact so that both the filter plates and the filter cloths are jolted for cake removal. Therefore, as compared with known apparatuses for cake removal of the type in which the filter cloths are previously subjected to tension by filter cloth support means using springs or the like and, each time individual filter plates are separated one from another, the filter cloth support means are subjected to oscillation in order to remove cake depositing on each filter cloth, the apparatus of the invention is advantageous in that its cake removing mechanism is simple in construction, and in that jolting effect sufficient to allow the cake to be separated from the filter cloth can be given to the filter cloth without requiring adjacent filter plates to be widely separated from each other.

Therefore, the cake removal apparatus of the invention can be applied to a filter press of the simultaneous separation type in place of a conventional filter-cloth running type apparatus cake removing apparatus and without increasing the length of the filter press.

Furthermore, the apparatus for cake removal of the invention can be easily applied to a filter press of the simultaneous plate separation type by installing such simple filter-cloth jolting means as described with respect to the foregoing embodiments, and if cakes involved are of such well separable type, the cakes can be efficiently removed by the apparatus of the invention without trouble. As such, in contrast to any conventional filter-cloth running type cake removal apparatus in a simultaneous separation type filter press, the cake removal apparatus of the invention is highly suitable for use in filtering any sludge which is easy to filter and which, when filtered, can produce highly separable cakes.

Thus, according to the invention, it is possible to provide a simultaneous separation type filter press that is highly efficient, inexpensive, and well suited for filtration of such sludge.

What is claimed is:

1. For use in a filter press including a pair of parallel guide rails supported by machine frames at a predetermined level, each guide rail having an upper surface, a multiplicity of filter plates suspendedly supported on the rails for movement in the longitudinal directions of the rails, each filter plate having a lower end portion, a pair of clamping heads disposed in such a way that the filter plates are entrained between the heads so as to form an entrained assembly of filter plates, the filter plates individually having their both surfaces covered with separate filter cloths, an apparatus for cake removal comprising:

(i) the filter plates, as well as each outermost one of the filter plates and both of the clamping heads, are separably interconnected, at a level adjacent the upper surface of the guide rails, by loose connecting means which permit individual adjacent ones of the filter plates to be equally spaced from one another when the clamping heads are moved in opposite directions until they are apart a predetermined distance from each other, means for separating and assembling the filter plates together being connected to both of the two clamping heads;

(ii) the filter plates, when separated from one another, are individually swingable about their interconnections with the loose connecting means, while being supported on the guide rails; and (iii) the filter plates entrained between the clamping heads are equipped with jolting means for causing selected filter plates to swing so that the lower end portions thereof are caused to strike against the lower end portion of a preceding or succeeding adjacent filter plate when the filter plates are separated in equally spaced apart relation via said loose connecting means, whereby all the filter plates and associated filter cloths are jolted.

2. An apparatus for cake removal in a filter press as set forth in claim 1, wherein said jolting means for jolting the filter plates comprise chains extending longitudinally along the entrained assembly of the filter plates at both sides thereof and connected to each alternate one of the filter plates at a point adjacent the lower end thereof, and chain drive means for reciprocally moving the chains in the longitudinally extending directions thereof, whereby if the chains are operated for movement back and forth along the longitudinally extending directions thereof when the two clamping heads are separated the predetermined distance away from each other and when the filter plates are separated from one another in equally spaced relation, those filter plates which are connected to the chains are caused to swing so that their respective lower end portions are individually caused to strike against the respective corresponding portions of those filter plates which are not connected to the chains.

3. An apparatus for cake removal in a filter press as set forth in claim 2, wherein the drive means for said chains comprise a pair of double acting hydraulic cylinders mounted at suitable locations on said pair of clamping heads, said chains being connected at one end to one of the hydraulic cylinders and at the other end to the other of the hydraulic cylinders so that when respective piston rods of the hydraulic cylinders are actuated to advance and retract, the chains are reciprocally moved in the longitudinal directions thereof.

4. An apparatus for cake removal in a filter press as set forth in claim 1, wherein the jolting means for jolting the filter plates comprise a pair of wheels disposed at suitable locations on said clamping heads and rotatably supported in position, an endless chain trained over the wheels and running alongside the entrained assembly of the filter plates, and forward/reverse drive means for the chain, said chain having portions movable along the train of filter plates in opposite directions, one of said portions being connected to odd numbered filter plates counting from the first plate next to one of the clamping heads while the other portion is connected to even numbered filter plates counting from said first plate, so that if said chain is driven forward or reverse when the filter plates are separated from one another in equally spaced relation, with the clamping heads moved in opposite directions to give the predetermined distance therebetween, respective lower end portions of the filter plates connected to the chain being caused to swing so that respective lower end portions of adjacent filter plates, odd numbered and even numbered, are caused to strike against each other.

5. An apparatus for cake removal in a filter press as set forth in claim 1, wherein the filter plates, in their respective lower end portions on both sides, have recesses cut out at transversely spaced locations, whereby when the filter plates are caused to swing by said jolting means, respective lower end portions of the filter plates, with filter cloths therebetween, are caused to strike against one another at unrecessed portions.

* * * * *